(12) United States Patent
Hubauer et al.

(10) Patent No.: US 10,545,967 B2
(45) Date of Patent: Jan. 28, 2020

(54) CONTROL APPARATUS OF AN AUTOMATION SYSTEM

(71) Applicant: SIEMENS AKTIENGESELLSCHAFT, München (DE)

(72) Inventors: Thomas Hubauer, Garching bei München (DE); Steffen Lamparter, Feldkirchen (DE); Martin Ringsquandl, Traunstein (DE); Mikhail Roshchin, München (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 326 days.

(21) Appl. No.: 15/513,272

(22) PCT Filed: Sep. 25, 2014

(86) PCT No.: PCT/EP2014/070521
§ 371 (c)(1),
(2) Date: Mar. 22, 2017

(87) PCT Pub. No.: WO2016/045734
PCT Pub. Date: Mar. 31, 2016

(65) Prior Publication Data
US 2017/0316061 A1    Nov. 2, 2017

(51) Int. Cl.
*G06F 16/00* (2019.01)
*G06F 16/2457* (2019.01)
(Continued)

(52) U.S. Cl.
CPC ..... *G06F 16/24575* (2019.01); *G05B 19/054* (2013.01); *G06F 16/2457* (2019.01); *G06F 16/285* (2019.01)

(58) Field of Classification Search
CPC ............ G06F 16/24575; G06F 16/285; G06F 16/2457; G05B 19/054
(Continued)

(56) References Cited

U.S. PATENT DOCUMENTS

| 7,904,909 B1 * | 3/2011 | Reiner ................ G06F 9/5061 |
| | | 709/223 |
| 7,930,639 B2 | 4/2011 | Baier et al. |

(Continued)

FOREIGN PATENT DOCUMENTS

| CN | 103676823 A1 | 6/2014 |
| DE | 102010043651 A1 | 3/2012 |

OTHER PUBLICATIONS

International Search Report for PCT Application No. PCT/EP2014/070521, dated Jun. 17, 2015.

*Primary Examiner* — Thanh-Ha Dang
(74) *Attorney, Agent, or Firm* — Schmeiser, Olsen & Watts LLP (57) ABSTRACT

A control apparatus of an automation system, the control apparatus includes a database adapted to store time series data in a historian data source and adapted to store events derived from the time series data based on event detection rules in an event data source, wherein a semantic data or event query received by the control apparatus is mapped to a corresponding data source of the database to retrieve the queried data or event which are contextualized using an ontological context model of the automation system stored in the database and output by control apparatus in a semantic format is provided.

22 Claims, 7 Drawing Sheets (51) Int. Cl.
*G06F 16/28* (2019.01)
*G05B 19/05* (2006.01)

(58) Field of Classification Search
USPC .......................................................... 707/713
See application file for complete search history.

(56) References Cited

U.S. PATENT DOCUMENTS

| | | | | |
|---|---|---|---|---|
| 8,285,827 | B1* | 10/2012 | Reiner | G06F 9/50 |
| | | | | 702/35 |
| 8,700,192 | B2 | 4/2014 | Heller et al. | |
| 9,792,388 | B2* | 10/2017 | Kawabata | G06Q 30/0201 |
| 2010/0317420 | A1* | 12/2010 | Hoffberg | G06Q 30/0207 |
| | | | | 463/1 |
| 2012/0011141 | A1* | 1/2012 | Park | G06F 16/3349 |
| | | | | 707/769 |
| 2012/0259895 | A1* | 10/2012 | Neely, III | G06F 16/367 |
| | | | | 707/798 |
| 2014/0279764 | A1* | 9/2014 | Lahr | G06F 9/5038 |
| | | | | 706/12 |

* cited by examiner

Raw Sensor Data
(TSD)

FIG 7

| Context Model URI | Name |
|---|---|
| http://siemens.com/ontologies/PositioningSensorA | Positioning Sensor A |

| Context Model URI | Type |
|---|---|
| http://siemens.com/ontologies/PositioningSensorA | Sensor |

| Context Model URI | Sensor ID |
|---|---|
| http://siemens.com/ontologies/PositioningSensorA | 13 |

FIG 8

```
PREFIX xsd: <http://www.w3.org/2001/XMLSchema#>
PREFIX o: <http://siemens.com/ontologies#>

SELECT *
     WHERE   {     ?measurement o:sampledBy o:PositioningSensorA ;
                        o:value ?value ;
                        o:timestamp ?date .

FILTER
               (
               ?date > "2014-07-01T00:00:00"^^xsd:dateTime
               &&
               ?date < "2014-07-08T23:59:59"^^xsd:dateTime
               )
}
```

FIG 9

| Sensor ID | Value | Timestamp |
|---|---|---|
| 13 | 231.5 | 2014-07-01T02:00:00 |
| 13 | 230.0 | 2014-07-03T12:10:02 |
| 13 | 512.2 | 2014-07-05T08:10:02 |

FIG 10

```
:Measurement1 a :Measurement ;
        :value "231.5"^^xsd:double ;
        :sampledBy :PositioningSensorA ;
        :timestamp "2014-07-01T02:00:00Z"^^xsd:datetime .
```

CONTROL APPARATUS OF AN AUTOMATION SYSTEM

CROSS-REFERENCE TO RELATED APPLICATIONS

This application claims priority to PCT Application No. PCT/EP2014/070521, having a filing date of Sep. 25, 2014, the entire contents of which are hereby incorporated by reference.

FIELD OF TECHNOLOGY

The following relates to a control apparatus of an automation system and a method for retrieving semantically data or events from the control apparatus.

BACKGROUND

Automation systems such as automation systems used in an assembly line of a production facility become more and more complex and can comprise a plurality of physical and/or other components. The automation system components can comprise sensors and/or actuators. Due to the increasing number of sensors and/or actuators installed in the automation system, the amount of data describing the underlying technical process is growing. The data, in particular the sensor data, generated by the sensor components or sensor devices provide a huge potential to gain additional insights into the effectiveness of the processes performed within the automation system which can be used for enhancements and optimizations of the automation system. However, making sense out of the available data using conventional data analytics methods is extremely difficult if the context and/or the reasons of data provision are not known. The context can be for instance the location of the respective sensor component within the automation system that generated the sensor data, the identifier of the product or batch processed within the automation system when the data was generated or a maintenance task that was executed shortly before the sensor data was generated.

SUMMARY

An aspect relates to providing an apparatus and a method which provide data or events relating to an automation system in their context.

Embodiments of the invention provided according to a first aspect a control apparatus of an automation system, said control apparatus comprising a database adapted to store time series data in a historian data source and adapted to store events derived from said time series data based on event detection rules in an event data source, wherein a semantic data or event query received by this control apparatus is mapped to a corresponding data source of said database to retrieve the queried data or event which are contextualized using an ontological context model of said automation system stored in said database and output by said control apparatus in a semantic format.

In a possible embodiment of the control apparatus according to the first aspect of the present invention, the control apparatus is a programmable logic controller, PLC, of the automation system.

In a still further possible embodiment of the control apparatus according to the first aspect of the present invention, the programmable logic controller comprises as a database an integrated memory for at least one historian data source and at least one event data source.

In a still further possible embodiment of the control apparatus according to the first aspect of the present invention, the integrated memory is adapted to store the ontological context model of said automation system and/or the event detection rules.

In a still further possible embodiment of the control apparatus according to the first aspect of the present invention, the received generic semantic query is rewritten using the ontological context model of said automation system to provide an extended semantic query with specific context, wherein the extended semantic query is translated to the query language of the corresponding data source of said database.

In an alternative embodiment, the received semantic query is directly translated to the query language of the corresponding data source of said database.

In a further possible embodiment of the control apparatus according to the first aspect of the present invention, the historian data source of the database is adapted to store time series data of at least one automation system component, in particular a sensor device of said automation system, connected to said control apparatus.

In a still further possible embodiment of the control apparatus according to the first aspect of the present invention, the stored time series data comprises data values each provided with a corresponding timestamp and a component identifier of the respective automation system component generating the time series data.

In a still further possible embodiment of the control apparatus according to the first aspect of the present invention, the control apparatus is adapted to gather continuously time series data from connected automation system components and to derive events from the gathered time series data in every real-time control cycle of said automation system and to write the time series data and the derived events in the corresponding data sources of the database.

In a still further possible embodiment of the control apparatus according to the first aspect of the present invention, each event derived from the gathered time series data based on the event detection rules is represented by a specific message identifier and written in an event table forming an event data source.

In a still further possible embodiment of the control apparatus according to the first aspect of the present invention, a sensor providing time series data and/or event types are annotated based on the ontological context model as representations of context instances of the ontological context model.

In a still further possible embodiment of the control apparatus according to the first aspect of the present invention, the semantic data or event query comprises a semantic identifier mapped to a specific data source location of a corresponding data source of said database.

In a still further possible embodiment of the control apparatus according to the first aspect of the present invention, the semantic data or event query is received by said control apparatus from a server connected to said control apparatus and the queried contextualized data or event are returned by said control apparatus to said server in a semantic triple format.

In a further possible embodiment of the control apparatus according to the first aspect of the present invention, the received semantic data or event query comprises a SPARQL query and the returned contextualized data or event comprises a semantic resource description framework, RDF, triple format.

In a still further possible embodiment of the control apparatus according to the first aspect of the present invention, during the real-time control cycle of the automation system, where a received data or event query is executed, the historian data sources and event data sources of the database are blocked and the gathered time series data and/or derived events are stored temporarily in a buffer memory of said control apparatus.

In a still further possible embodiment of the control apparatus according to the first aspect of the present invention, the ontological context model of said automation system represents components of said automation system including devices of said automation system, attributes of the components and relations between the components.

Embodiments of the invention provided according to the second aspect an automation system comprising at least one control apparatus according to the first aspect of the present invention and at least one automation system component connected to said control apparatus supplying time series data to said control apparatus.

In a possible embodiment of the automation system according to the second aspect of the present invention, the control apparatus is connected to an external server which sends semantic data or event queries to said control apparatus which is configured to execute the received data or event queries and to return the queried data or event of said external server in a semantic format.

In a further possible embodiment of the automation system according to the second aspect of the present invention, the automation system component comprises a sensor device of the automation system.

In a further possible embodiment of the automation system according to the second aspect of the present invention, the external server has access to the ontological context model of the automation system.

In a still further possible embodiment of the automation system according to the second aspect of the present invention, the control apparatus comprises a programmable logic controller, PLC, of the automation system.

The programmable logic controller, PLC, comprises in a possible embodiment an integrated memory for at least one historian data source and at least one event source.

In a possible embodiment of the automation system, the integrated memory of the control apparatus is further adapted to store the ontological context model of the automation system and/or the event detection rules.

In a further possible embodiment of the automation system according to the second aspect of the present invention, the historian data source of the database of said control apparatus within said automation system is adapted to store time series data of at least one automation system component, in particular a sensor device of said automation system, connected to said control apparatus of said automation system.

In a further possible embodiment of the automation system according to the second aspect of the present invention, the control apparatus, in particular the programmable logic controller, PLC, is adapted to gather continuously time series data from connected automation system components of said automation system and to derive events from the gathered time series data in every real-time control cycle of said automation system and to write the time series data and the derived events in the corresponding data sources of the database integrated in the control apparatus.

In a possible embodiment of the automation system according to the second aspect of the present invention, the semantic data or event query is received by the control apparatus from the server of the automation system connected to said control apparatus and the queried contextualized data or event are returned by this control apparatus back to the server of the automation system in a semantic triple format, in particular in a semantic resource description framework, RDF, triple format.

In a possible embodiment of the automation system according to the second aspect of the present invention, the data sources stored in the database of the control apparatus are not contextualized data sources.

According to the third aspect, the present invention provides a method for retrieving semantically data or events from a control apparatus of an automation system comprising the steps of receiving by said control apparatus a semantic data or event query, mapping the received semantic data or event query to a corresponding data source stored in a database of said control apparatus to retrieve the queried data or event, performing a contextualization of the queried data or event using an ontological context model of the automation system, and outputting by the control apparatus the contextualized data or event in a semantic format.

BRIEF DESCRIPTION

Some of the embodiments will be described in detail, with reference to the following figures, wherein like designations denote like members, wherein.

DETAILED DESCRIPTION

Figure 1:
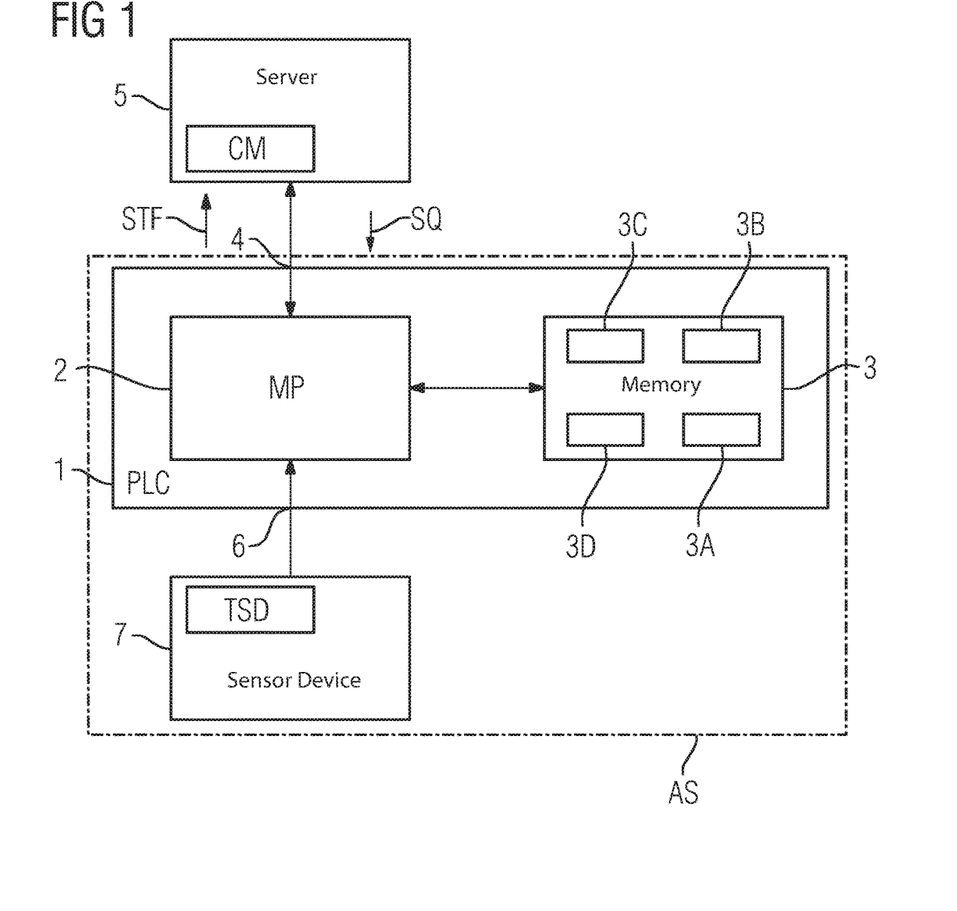
FIG. 1 shows a block diagram of an exemplary embodiment of a control apparatus of an automation system.

As can be seen in FIG. 1, a control apparatus 1 of an automation system AS according to the first aspect of embodiments of the present invention comprised in the illustrated embodiment a microprocessor 2 connected to a database 3. The database 3 is formed in the shown exemplary embodiment by a memory integrated in the control apparatus 1. In an alternative embodiment, the database 3 can also be connected to the control apparatus 1 via an interface. The control apparatus 1 as shown in FIG. 1 can in a possible embodiment be formed by a programmable logical controller, PLC, of the automation system AS. The control apparatus 1 comprises in a possible embodiment a standard interface 4 for communicating with an external server 5 of the automation system to receive data or event queries SQ and to return query data or events to said external server 5 in a semantic format. The control apparatus 1 can further comprise one or several I/O interfaces 6 to connect at least one sensor device 7 of the automation system AS to said control apparatus 1. The integrated memory 3 of the controller 1 as illustrated in FIG. 1 comprises in the shown embodiment at least one historian data source 3A and at least one event data source 3B. In the shown embodiment, the memory 3 further comprises a storage 3C for event detection rules EDR and a storage 3D for storing an ontological context model CM of the respective automation system. The database 3 of the control apparatus 1 is adapted to store time series data TSD in the historian data source 3A and is further adapted to store events E derived from the time series data TSD based on event detection rules EDR in the event data source 3B. The semantic data or event query SQ received by said control apparatus 1 via the interface 4 from the server 5 is mapped to a corresponding data source of the database 3 to retrieve the queried data or event which are contextualized using the ontological context model CM of the automation system AS stored in the context model storage 3D. The contextualized data is output by the control apparatus 1 via the interface 4 in a semantic format.

The historian data source 3A of the memory 3 is adapted to store data providing a historic view of plain sensor data as time series. In a possible embodiment, every data sample or sampled sensor data point is stored in the historian data storage 3A with a corresponding timestamp TS indicating the time of its generation and the sensor identifier identifying the sensor generating the sensor data.

Using the event detection rules EDR stored in the event detection rule storage 3C, events E are derived from the time series data TSD and stored as interpretation of plain sensor data in the event data storage 3B. The events E can for instance comprise the aggregation of multiple sensor data points or data samples. Since the event data has different characteristics compared to time series data TSD or raw sensor data, the event data is stored in the separate event data storage 3B of the memory 3. Each event E can be represented by a specific message identifier. A possible example for an event E is the exceeding of a predetermined threshold value by data sample values of the time series data TSD received from a sensor device 7.

The ontological context model CM stored in the storage 3D provides a semantic description of the context in which the data, in particular sensor data, is received by the control apparatus 1 from connected automation system components such as sensor components. The context model CM can be used to annotate every sensor device providing data samples and every event type with context knowledge in order to represent it as an instance of an ontology. The semantic data or event query SQ received by the control apparatus 1 from the server 5 is mapped to a corresponding data source within the memory 3 to retrieve the queried data or event. The queried data or event is then contextualized using the ontological context model CM stored in the context model storage 3D. The context model CM is expressed in a preferred embodiment in a standardized form using a standardized, formal domain-independent language such as OWL or RDF. In the system illustrated in FIG. 1, context is added to the received data already on PLC level where quantity and quality of data is higher and all necessary context information is available. The contextualization is directly done in and by the control apparatus 1 itself and not by an external system as in a conventional automation system. In a preferred embodiment, the ontological context model CM is expressed in a standardized, formal domain-independent language so that it is possible to change the context model CM dynamically. Further, it is possible to combine data from different data sources such as automation devices and integrate them semantically. In a further possible embodiment, different context models CM, i.e. ontologies, from different domains or covering different aspects such as product, asset, process and/or automation system components can be combined and linked to each other to define an overall automation system context. The modular structure of the employed ontology languages makes it possible to dynamically add or remove context dimensions to automation system data. For example, depending on the application or recipient of data more or less context information can be added to the raw time series data TSD by the control apparatus 1. The context information can be assigned statically as well as dynamically to the received data. For example, contextualization can be performed via events E detected in the incoming data stream or incoming time series data TSD or in response to situations or conditions observed in the system environment of the automation system AS. The employed ontological context models CM are not restricted to hierarchically organized context models but can also consist of a network, i.e. not only trees.

The control apparatus 1 as shown in FIG. 1 is adapted to gather continuously time series data TSD from connected automation system components such as sensor devices 7 and to derive events E from the gathered time series data in every real-time control cycle of the automation system AS and to write the time series data TSD and the derived events E in a corresponding data source DS of its database 3. During the real-time control cycle of the automation system AS where a received semantic data or event query SQ is executed by the control apparatus 1, the historian data sources HDS stored in the historian data storage 3A and the event data sources EDS stored in the event data storage 3B of the database 3 are blocked and the gathered time series data TSD and/or the derived events E are stored temporarily in a buffer memory of the control apparatus 1. Accordingly, no changes of the data in the historian data sources HDS and in the event data sources EDS are allowed during execution of a query to provide a consistent data status of the historian and event data sources. In a possible embodiment, this is performed by a dedicated synchronization procedure. All changes required during the time the historian and event data sources are blocked are buffered in a buffer memory. Once writing permission is granted by the synchronization procedure again, the content of the memory buffer is written to the historian and event data sources.

The automation system components, in particular sensor devices and actuators, can provide via I/O interfaces 6 time series data, in particular measurements from physical processes performed within the automation system AS. The components comprise hardware and/or software components. Accordingly, the sensor device 7 can also be implemented by a soft sensor providing time series data TSD. The received time series data TSD can be preserved as such by the control apparatus 1 within a storage mechanism and can be retrieved by a server 5 by sending data or event queries SQ to the control apparatus 1. In the embodiment shown in FIG. 1, the control apparatus 1 comprises a microprocessor 2. In an alternative embodiment, the controller 1 can comprise several microprocessors which are used to gather data from the I/O interfaces 6. The microprocessor 2 is adapted to process the received semantic queries SQ and to return contextualized data in a semantic format. The memory 3 can for instance be formed by a RAM memory, a HDD or an SD device. The context model CM can include information about control processes, control procedures, connected soft- or hardware automation components such as sensor devices or actuators. The context models CM can be represented semantically using an ontology. The control apparatus 1 comprises a communication link to an external server 5. The server 5 can receive contextualized data either by actively querying data or by registering to a certain kind of data. Accordingly, the contextualized data can be provided to the server 5 in a push mode or in a pull mode. The communication between the external server 5 and the control apparatus 1 is done in a possible embodiment using standard formal languages and interfaces. In a possible embodiment, queries SQ can be specified in SPARQL language based on context models. Results can be formalized in a resource description framework, RDF, format. In a possible embodiment, the semantic data or event query SQ received by the control apparatus 1 from the external server 5 is processed and the queried contextualized data or event are returned by the control apparatus 1 to the external server 5 in a semantic triple format STF. The received semantic data or event query SQ transmitted by the server 5 can comprise a SPARQL query and the returned contextualized data or event can comprise a semantic resource description framework, RDF, triple format.

Figure 2:
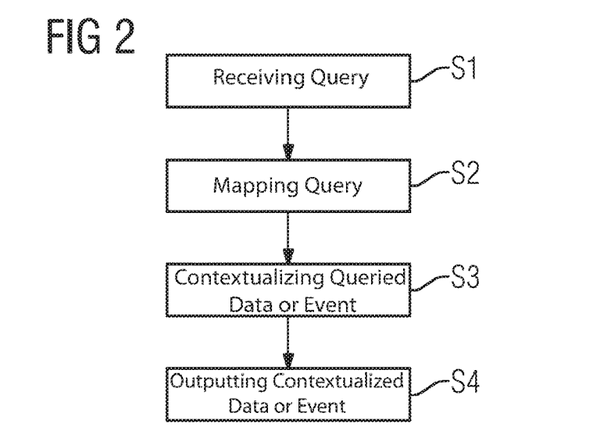
FIG. 2 shows a flowchart of an exemplary embodiment of a method for retrieving semantically data or events from the control apparatus of an automation system.

FIG. 2 shows a schematic flowchart illustrating an exemplary embodiment of the method for retrieving semantically data or events from a control apparatus 1 of an automation system AS according to a further aspect of the present invention.

In a first step S1, the control apparatus 1 as illustrated in FIG. 1 receives a semantic data or event query SQ, for instance from an external server 5 as illustrated in FIG. 1. The semantic query SQ can be for instance a SPARQL query.

In a further step S2, the received semantic data or event query SQ is mapped to a corresponding data source DS stored in a database 3 of the control apparatus 1 to retrieve the queried data or event.

In a possible embodiment, the received semantic query SQ is rewritten using the ontological context model CM of the automation system AS to provide an extended semantic query ESQ with specific context. The extended semantic query SQ is then translated to the query language of the corresponding data source DS of the database 3.

In an alternative embodiment, the received semantic query SQ is directly translated to the query language of the corresponding data source DS of the database 3.

In a further step S3, a contextualization of the queried data or event is performed using an ontological context model CM of the automation system.

Finally, the contextualized data or event is output in step S4 by the control apparatus 1 in a semantic format.

Figure 3:
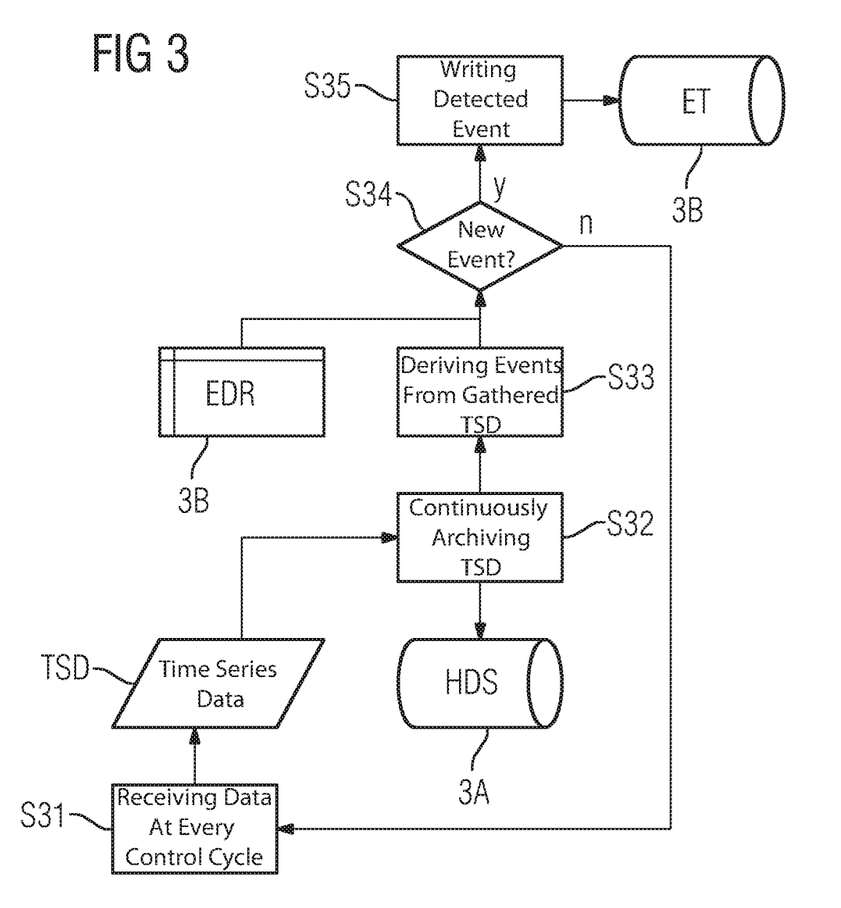
FIG. 3 shows schematically the data generation and storage on a control apparatus within a real-time control cycle of an automation system as performed in an exemplary embodiment of the method and control apparatus.

FIG. 3 shows a schematic diagram for illustrating the data generation and storage on a control apparatus 1 within a real-time control cycle of the automation system AS. As illustrated in FIG. 3, the control apparatus 1 receives in step S31 at every control cycle of the automation system AS or automation process new plain sensor data on the connected automation system components. Incoming time series data TSD is continuously archived in step S32 in a historian data source HDS of the historian data storage 3A of the memory 3 integrated in the control apparatus 1. In a further step S33, events E are derived from the received time series data TSD based on events detection rules, EDR, stored in the event data storage 3B of the memory 3. Further, in step S34, it is decided, whether a new event E has occurred. If no new event has occurred, then the routine returns to step S31 as illustrated in FIG. 3. If a new event E is detected, the detected event E is written in step S35 into an event table, ET, forming an event data source EDS stored in the event data storage 3B of the memory 3. It is collected and stored in the event table ET according to predetermined rules. The steps illustrated in the flowchart of FIG. 3 are executed in a control cycle of the control apparatus 1 because otherwise data may get lost or data may be overwritten. For the historian data, no overhead is introduced by the routine illustrated in FIG. 3. The event generation can introduce additional computational effort which can be limited by controlling the complexity of the event detection rules, EDR. FIG. 3 illustrates the forming of a data storage by the control apparatus 1.

Figure 4:
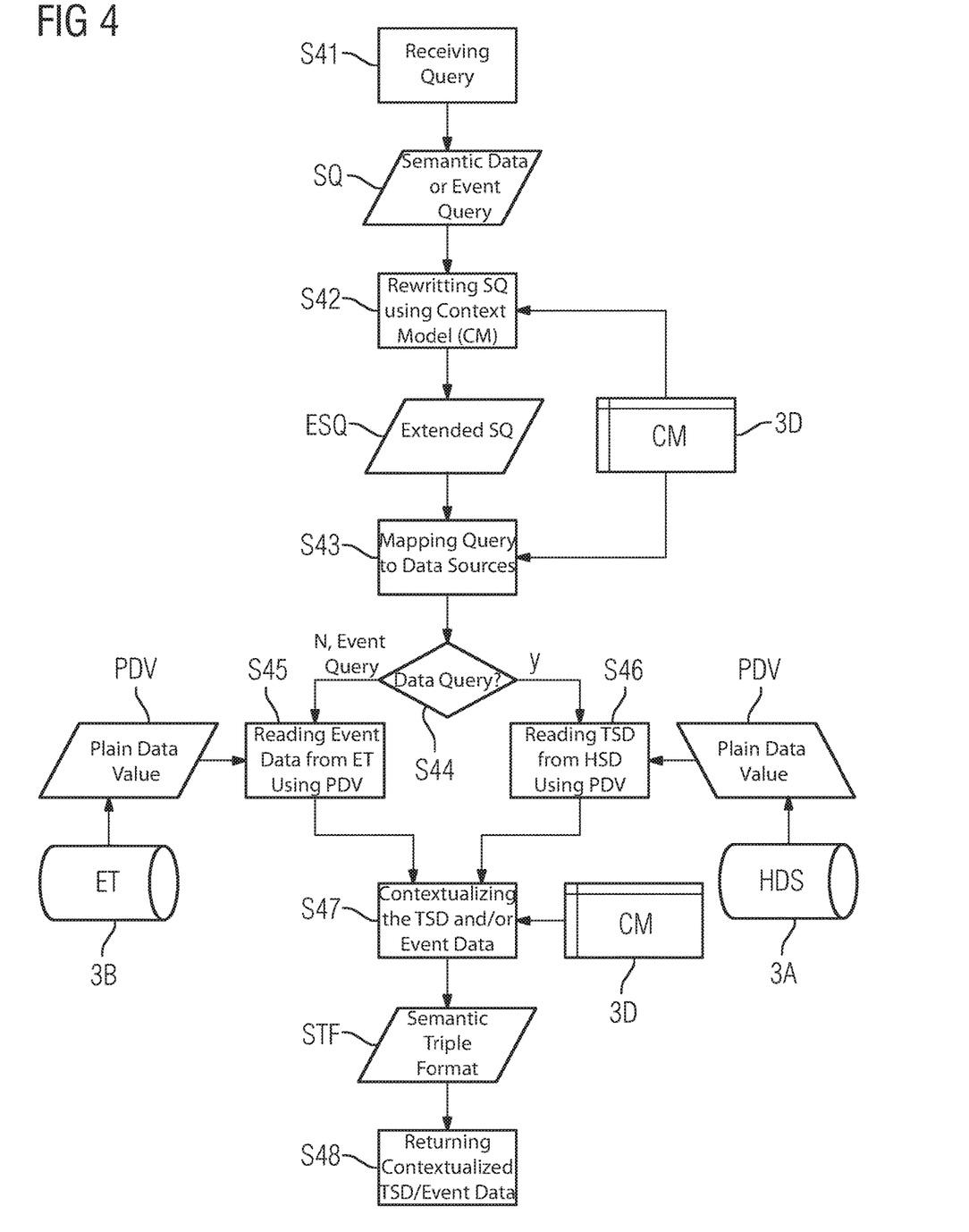
FIG. 4 shows a schematic diagram for illustrating an exemplary embodiment of query processing as performed by the method and control apparatus.

FIG. 4 illustrates in a schematic flowchart the retrieval of data from a control apparatus 1 in contextualized form.

In a first step S41, the control apparatus 1 receives a semantic data or event query SQ from an external entity such as an internal server 5. The received semantic query SQ can be for example a semantic SPARQL query for specific data or a specific event. The semantic query SQ is expressed based on the ontological context model CM.

In a further step S42, the received semantic query SQ is rewritten using the context model CM of the automation system AS to generate an extended semantic query, ESQ. The query rewriting performed in step S42, can rewrite the received semantic query SQ into first-order queries such that all retrieved data values are entailed in the ontology. The generic context of a received query is evaluated against the context model CM and is extended so that it also includes the data that underlie a more specific context. For instance, if a received query SQ asks for all visual sensor data values, the context of visual sensors needs to be extended to 3D sensors, photodiodes, etc. The processor of the control unit 1 can perform the rewriting in a possible embodiment by iterative search through a context hierarchy of the context model CM (e.g. hierarchy of sensors or events) until no more specific context can be found.

In a further step S43, a query mapping is performed. Depending on the type of the requested model context, the extended semantic query, ESQ, is mapped to a data model of a specific data source DS. For relational database access, this is also called unfolding. Hence, the routine provides a mapping of context model vocabulary to the vocabulary of the underlying data model (e.g. time series or relational data model).

The semantic data or event query SQ can comprise a semantic identifier mapped to a specific data source location of a corresponding data source DS within the database 3. The semantic data or event query SQ can be translated into the query language of the corresponding data source DS.

Semantic identifiers of context instances such as URIs comprise corresponding identifiers to access the specific data source location. For example, queries looking for instances of sensor data context are mapped to sensor IDs (columns) in the historian data source HDS as illustrated in the example of FIGS. 7, 8, 9.

Figure 7:
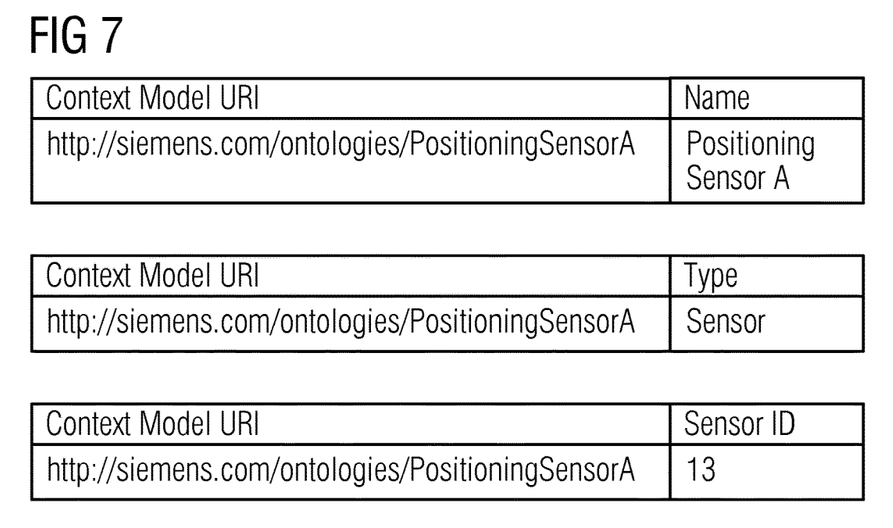
FIG. 7 illustrates an exemplary embodiment of a query mapping as performed by the method and control apparatus.

FIG. 7 illustrates an extract of a context model CM of a specific sensor device 7 of the automation system AS. FIG. 7 illustrates a vocabulary mapping knowledge. As can be seen, the sensor device with the name "Positioning sensor A" is a type of sensor (class sensor) and its sensor data is located at a data column 13 in the historian data source HDS.

Figure 8:
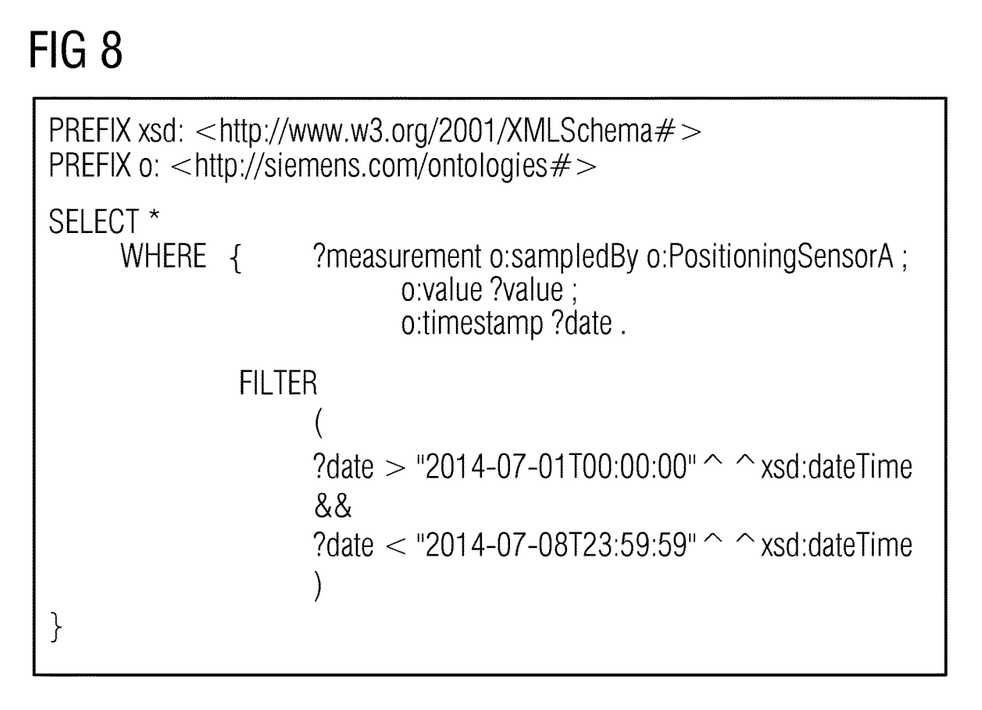
FIG. 8 illustrates an exemplary embodiment of a query mapping as performed by the method and control apparatus.

FIG. 8 illustrates an exemplary SPARQL query SQ received from the control apparatus 1 from the external server 5 requiring for a specific sensor data. The semantic query SQ selects all values of a particular sensor device over a period of time. As can be seen in FIG. 8, the SPARQL query requires data from a sensor device identified by its name "Positioning sensor A" over a period of time indicated by the filter, i.e. between Jul. 1, 2014 and Jul. 8, 2014.

Figure 9:
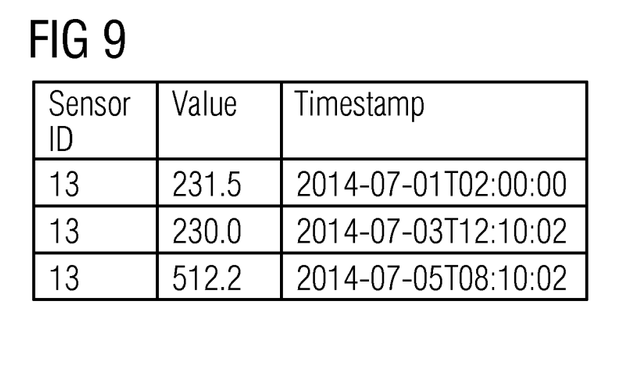
FIG. 9 illustrates an exemplary embodiment of a query mapping as performed by the method and control apparatus.

The stored context model CM of the automation system AS is used to resolve the URI specified in the SPARQL query of the sensor and maps it to the sensor ID which represents its location at the historian data source HDS as illustrated in FIG. 9. FIGS. 7, 8, 9 illustrate an example of a query mapping as performed in step S43 of the routine illustrated in FIG. 4.

Every context property such as an event name corresponds to plain data values which can be returned by the data source interface. In a possible embodiment, timestamp constraints are resolved, chronologically ordered and passed to the data source interface as parameters. In a further step S44, it can be decided, whether the received query is a data query or an event query. If it is decided that the received query is an event query, event data is read from the event table ET in step S45 using plain data values, PDV. In contrast, if it is decided in step S44 that the received query is an data query, time series data TSD is read from the historian data source HDS in step S46 getting plain data values, PDV, from the historian data source storage 3A of the memory 3.

Figure 10:
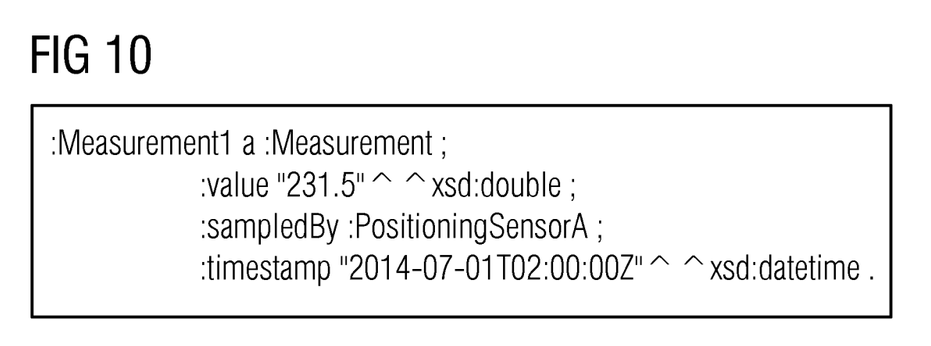
FIG. 10 shows an exemplary embodiment of contextualized data or event output in a semantic triple format.

In a further step S47, context information of the retrieved plain data values, PDV, is re-established by considering the extended context. In step S47, the contextualization of the queried data or event retrieved in steps S45, S46 is performed using the ontological context model CM of the automation system stored in the context model storage 3D of the memory 3. Accordingly, the contextualization or annotation is performed during retrieval of data in response to a received semantic query as illustrated in FIG. 4 and not as in conventional methods where the contextualization is performed immediately after generation of the time series data TSD. The returned output contextualized data or event comprises in a possible embodiment a semantic triple format, STF, in particular a semantic resource description framework, RDF, triple format. The created instance of the ontological context model is returned in step S48 in a semantic triple format STF to the inquiring entity, for instance the server 5. The semantic triple format STF is suitable for integration into an external triple store. FIG. 10 illustrates the returned contextualized data or event in response to the semantic query SQ shown in FIG. 8.

Figure 5:
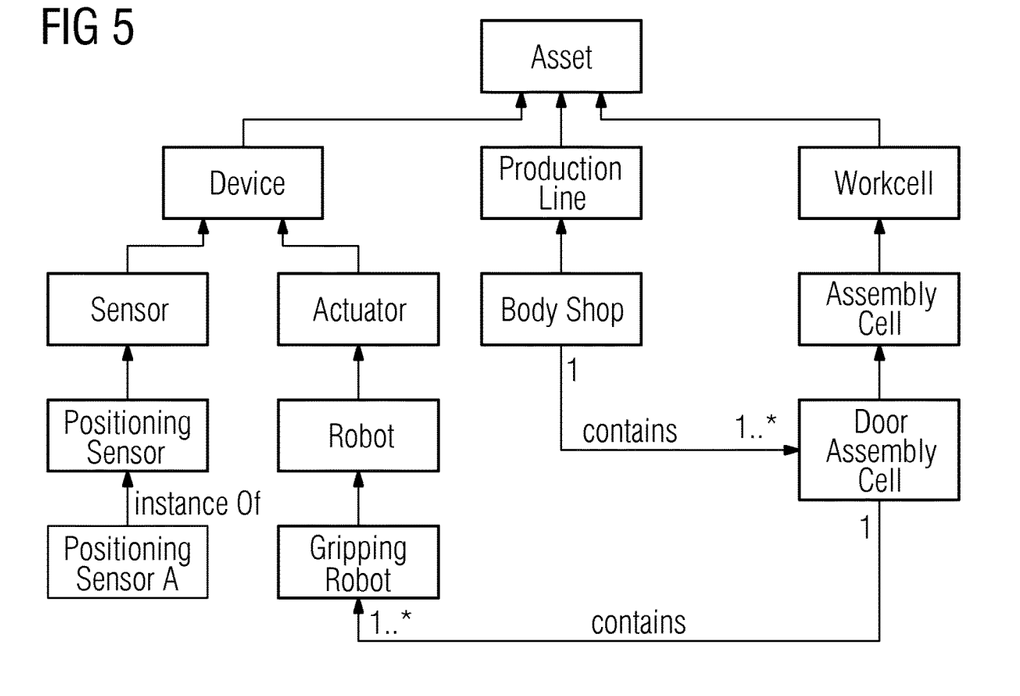
FIG. 5 shows an exemplary embodiment of a context model, which can be used by the method and control apparatus.

FIG. 5 illustrates an exemplary context model CM which can be used by the method and system according to embodiments of the present invention. The exemplary context model CM represents physical components in the topology of the automation system AS. In the shown example, the context model CM comprises a hierarchical structure of plant components of an industrial plant plus the attributes and relations. The ontological context model CM of the automation system AS represents components of the automation system including devices of the automation system AS, attributes of the components and relations between the components. Relations can include classification hierarchies (subclasses), location dependencies (e.g. one asset is part of another asset) or sequential dependencies (e.g. multiple assets involved in subsequent tasks). Knowledge sources for the specification of an ontological context model CM can be for instance a product lifecycle management, PLM, manufacturing execution systems, MES, and the TIA portal following standard equipment models of IEC 62264-1.

FIG. 5 illustrates as an example of an automation system a context model CM of a production line topology in an automotive manufacturing process that includes a simple door assembly cell, which is constrained to include at least one gripping robot. The context model CM can be implemented using standard languages such as Web Ontology Language (OWL) or Resource Description Framework (RDF). Consequently, the control level data can be easily integrated in other applications such as ERP, MOM which are provided to monitor or analyze the state of the automation system.

Figure 6:
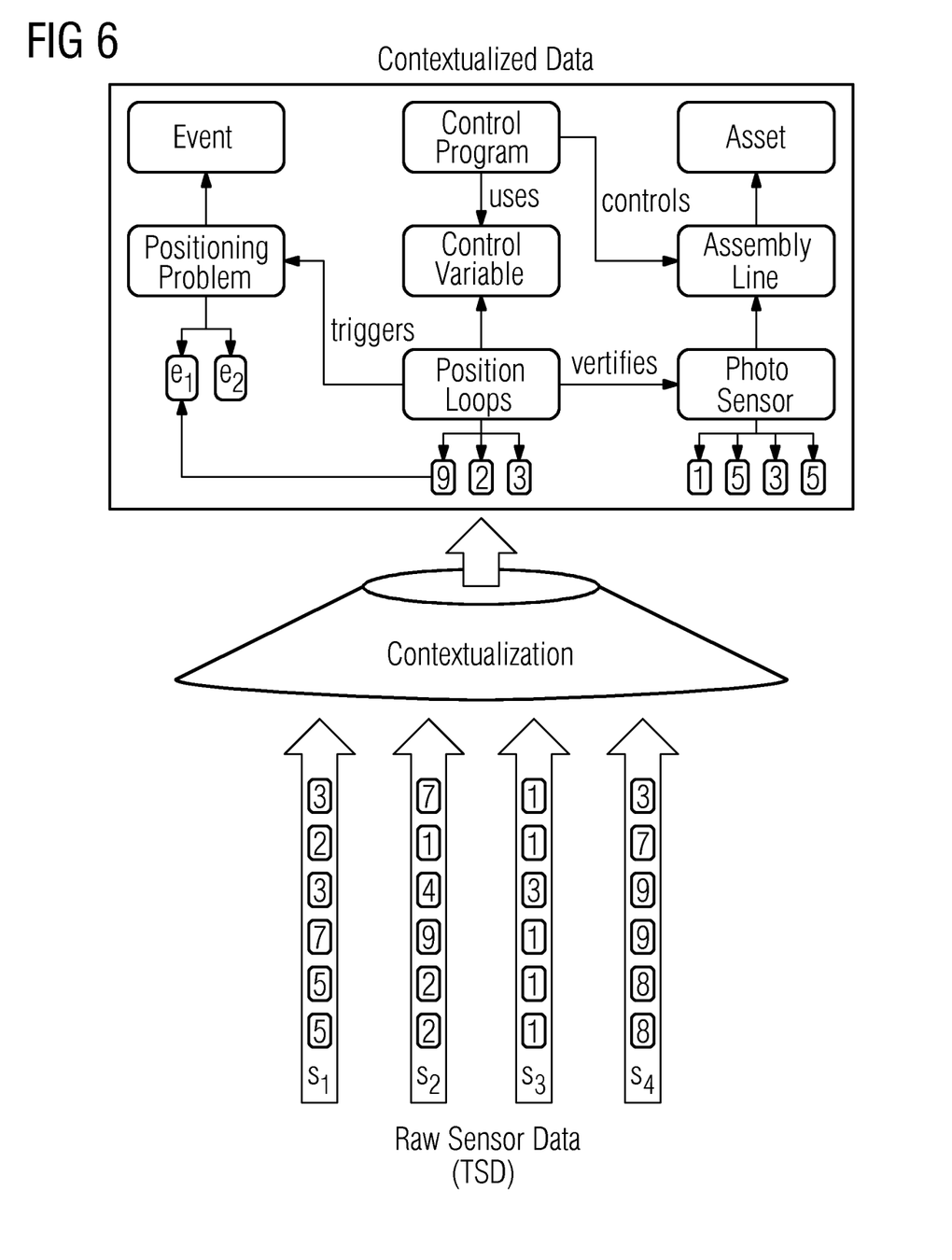
FIG. 6 shows a diagram for illustrating an exemplary example for contextualization of data as performed by the method and control apparatus.

FIG. 6 illustrates schematically the contextualization of time series data TSD formed by raw sensor data to provide contextualized data. Sensor data can be collected from sensor devices or other external subsystems. This data includes time series data TSD such as raw sensor data. The collected data can comprise in further possible embodiments also control events, alarms and other structured or unstructured data such as messages, in particular text messages. The received data can be annotated according to a relevant context model CM which are available as ontologies in a standard ontology language such as RDF or OWL. This can be either done by explicitly generating semantic data as instances of the respective ontology (e.g. triples) or by linking an identifier of the sensor device to the corresponding concept in the respective ontology which can then be resolved by a query processor. The semantically contextualized sensor data can be stored in a historian data source HDS (annotation via mapping of IDs) or alternatively, in a triple store (direct annotation of data). The incoming data such as sensor data can be used to update an active window of an event engine which continuously analyzes the received data in an active window in order to generate new events. The generation of the events E can be performed by a specification, in particular defined by event detection rules EDR or event detection patterns. Once an event E has been detected, contact information required for the event (as defined in the context model) is collected from the storage. New detected events are also stored in the storage. Data and storage is made available in a possible embodiment by means of a semantic query processor. This processor executes a query formulated against the semantic context model CM such as a SPARQL query and retrieves the relevant data. If the data is directly stored as semantic data (e.g. as RDF in a triple store), the query can be natively executed, whereas if the data is stored in a plain historian data source, the received query has to be translated based on the context models.

As illustrated in FIG. 6, the contextualization is performed by the control apparatus itself. The control apparatus 1 can be configured to decide which context may be provided to a certain external entity or which context information should not be provided to the external system entity. Adding explicit formal semantics to the retrieved data using standard languages enables third party systems to understand and to interpret the retrieved data without dedicated manual configuration. The explicit formal semantics enables a reuse of commodity analytics libraries for data interpretation, e.g. to detect complex event frames. Further, the explicit formal semantics allow to dynamically integrate data from different data sources or automation system components enabling plug and play concepts and reducing configuration efforts. Moreover, the use of standardized context languages and interfaces of the method and apparatus according to embodiments of the present invention enables interoperability with other systems. The contextualization infrastructure with declarative models enables model changes during runtime of the automation system without compilation or stopping the automation components of the automation system. The semantic contextualization on automation level further enables adding additional context information which is not available on higher levels. Further, the system according to embodiments of the present invention supports integration of external context sources (such as service reports, SIMATIC log files, etc.)

The contextualization performed by the control apparatus 1 can be provided independent from the automation system AS where the control apparatus 1 is installed. The contextualization can be implemented either by the PLC vendor or system provider of the automation system AS. As illustrated above, no redundant or inefficient data storage is necessary. The method and apparatus according to embodiments of the present invention allow an on-the-fly data integration. The method and apparatus according to embodiments of the present invention further supports reasoning based on a logical context model. For example, queries on general concepts return also suitable answers for more specific data. For example, the query "give all sensor data" will return data that also contains data for the more specific query "give all data from temperature sensors".

The storage of data and the retrieval of data is distinguished in a way that complex reasoning (e.g. OWL 2 QL reasoning can be integrated into real-time controls without compromising the real-time behavior, e.g. by prolongation of a cycle time). Data storage is performed within a control cycle of the automation system AS without additional overhead, whereas reasoning is performed during a query time outside of the control cycle. The method and apparatus according to embodiments of the present invention provide an on-demand data contextualization which can be used in any automation system AS. The automation system AS is in a preferred embodiment a real-time automation system, for instance an assembly line or any other production facility producing products. Embodiments of the invention provide an on-demand, i.e. query-driven, contextualization of time series data TSD and/or event data within a control apparatus 1 to provide contextualized data or an event in a semantic format.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A control apparatus of an automation system, the control apparatus comprising:
a database, connected to a processor of the control apparatus, adapted to store time series data in a historian data source and adapted to store events derived from the time series data based on event detection rules in an event data source,
the control apparatus being configured:
to gather continuously time series data from connected automation system components;
to derive events from the gathered time series data in every real-time control cycle of the automation system;
to store the time series data and the derived events in the corresponding data sources of the database;
to receive a semantic data or event query;
to map the received semantic data or event query to a corresponding data source of the database to retrieve the queried data or event;
to contextualize the received queried data or event using an ontological context model of the automation system stored in the database; and
to output the contextualized queried data or event in a semantic format.

2. The control apparatus according to claim 1, wherein the control apparatus is a programmable logic controller (PLC) of the automation system.

3. The control apparatus according to claim 2, wherein the programmable logic controller (PLC) comprises as the database, an integrated memory for at least one historian data source and at least one event data source.

4. The control apparatus according to claim 3, wherein the integrated memory is adapted to store the ontological context model of the automation system and/or the event detection rules.

5. The control apparatus according to claim 1, wherein the received generic semantic query is rewritten using the ontological context model of the automation system to provide an extended semantic query with specific context, wherein the extended semantic query is translated to the query language of the corresponding data source of the database or wherein the semantic query is directly translated to the query language of the corresponding data source of the database.

6. The control apparatus according to claim 1, wherein the historian data source of the database is adapted to store time series data of a sensor device of the automation system, connected to the control apparatus.

7. The control apparatus according to claim 6, wherein the stored time series data comprises data values each provided with a corresponding timestamp and a component identifier of the respective automation system component generating the time series data.

8. The control apparatus according to claim 1, wherein the control apparatus is adapted to gather continuously time series data from connected automation system components and to derive events from the gathered time series data in every real-time control cycle of the automation system and to write the time series data and the derived events in the corresponding data sources of the database.

9. The control apparatus according to claim 1, wherein each event derived from the gathered time series data based on the event detection rules is represented by a specific message identifier and written in an event table forming an event data source.

10. The control apparatus according to claim 1, wherein an automation system component providing time series data and/or event types are annotated in response to the received semantic query based on the ontological context model as representations of context instances of the ontological context model.

11. The control apparatus according to claim 10, wherein the semantic data or event query comprises a semantic identifier mapped to a specific data source location of a corresponding data source of the database.

12. The control apparatus according to claim 1, wherein the semantic data or event query is received by the control apparatus from a server connected to the control apparatus and the queried contextualized data or event are returned by the control apparatus to the server in a semantic triple format.

13. The control apparatus according to claim 12, wherein the received semantic data or event query comprises a SPARQL query and the returned contextualized data or event comprises a semantic resource description framework (RDF) triple format.

14. The control apparatus according to claim 1, wherein during the real-time control cycle of the automation system, where a received data or event query is executed, the historian data sources and the event data sources of the database are blocked and the gathered time series data and/or derived events are stored temporarily in a buffer memory of the control apparatus.

15. The control apparatus according to claim 1, wherein the ontological context model of the automation system represents components of the automation system including devices of the automation system, attributes of the components and relations between the components.

16. An automation system comprising at least one control apparatus according to claim 1 and at least one automation system component connected to the control apparatus supplying time series data to the control apparatus.

17. The automation system according to claim 16, wherein the control apparatus is connected to an external server which sends semantic data or event queries to the control apparatus which is configured to execute the received data or event queries and to return the queried data or event to the external server in a semantic format.

18. The automation system according to claim 16, wherein the automation system component comprises a sensor device of the automation system.

19. The automation system according to claim 17, wherein the external server has access to the ontological context model of the automation system.

20. The automation system according to claim 19, wherein the data sources stored in the database of the control apparatus are not contextualized data sources.

21. A method for retrieving semantically data or events from a control apparatus of an automation system performed by a processor of the control apparatus, comprising:
(a) gathering continuously time series data from connected automation system components;
(b) deriving events from the gathered time series data in every real-time control cycle of the automation system;
(c) writing the gathered time series data and the derived events in the corresponding data sources of a database of the control apparatus;
(d) receiving by the control apparatus a semantic data or event query;
(e) mapping the received semantic data or event query to a corresponding data source stored in a database of the control apparatus to retrieve the queried data or event;
(f) performing a contextualization of the queried data or event using an ontological context model of the automation system; and
(g) outputting by the control apparatus the contextualized data or event in a semantic format.

22. The method according to claim 21, wherein the received semantic data or event query is rewritten using the ontological context model of the automation system to provide an extended semantic query with specific context, wherein the extended semantic query is translated to the query language of the corresponding data source of the database of the control apparatus or wherein the received semantic query is directly translated to the query language of the corresponding data source of the database of the control apparatus.

* * * * *